(12) United States Patent
Nakamae et al.

(10) Patent No.: US 7,843,633 B2
(45) Date of Patent: *Nov. 30, 2010

(54) LASER PROCESSING APPARATUS

(75) Inventors: Kazuo Nakamae, Yokohama (JP);
Hiroki Moriwaki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 393 days.

This patent is subject to a terminal disclaimer.

(21) Appl. No.: 12/007,385

(22) Filed: Jan. 9, 2008

(65) Prior Publication Data

US 2008/0170291 A1    Jul. 17, 2008

(30) Foreign Application Priority Data

Jan. 15, 2007    (JP)    ............................. 2007-006195

(51) Int. Cl.
G02B 5/00    (2006.01)

(52) U.S. Cl. .................. 359/362; 359/894; 219/121.6

(58) Field of Classification Search ................ 359/362, 359/601, 613, 614, 885, 894, 385, 386, 388, 359/399, 421, 423, 432, 434, 435, 484, 485, 359/494–497; 372/6, 29.02, 29.022, 101, 372/103, 703; 385/31, 33; 219/121.6, 121.78, 219/121.79; 362/551, 552, 553, 583

See application file for complete search history.

(56) References Cited

U.S. PATENT DOCUMENTS

| | | | |
|---|---|---|---|
| 3,329,474 A | | 7/1967 | Harris et al. |
| 4,548,478 A | | 10/1985 | Shirasaki |
| 5,136,598 A | * | 8/1992 | Weller et al. .................. 372/26 |
| 5,384,689 A | | 1/1995 | Shen |
| 5,546,486 A | * | 8/1996 | Shih et al. ..................... 385/31 |
| 5,661,829 A | * | 8/1997 | Zheng .......................... 385/33 |
| 5,780,806 A | | 7/1998 | Ferguson et al. |
| 6,075,642 A | * | 6/2000 | Chang .......................... 359/281 |
| 6,236,146 B1 | | 5/2001 | Cramer et al. |
| 6,278,078 B1 | | 8/2001 | Walvoord et al. |
| 6,335,941 B1 | | 1/2002 | Grubb et al. |
| 6,407,844 B1 | | 6/2002 | Yang et al. |

(Continued)

FOREIGN PATENT DOCUMENTS

JP    57-100410 A    6/1982

(Continued)

*Primary Examiner*—Frank G Font
(74) *Attorney, Agent, or Firm*—Venable LLP; Michael A. Sartori; Steven J. Schwarz (57) ABSTRACT

The present invention relates to a laser processing apparatus which can be miniaturized and has a structure for achieving effective protection of the fiber laser light source. The laser processing apparatus comprises a fiber laser light source, a collimator, a spatial filter, an optical isolator, and a condenser lens. The optical isolator emits laser light from the collimator laser light in parallel to the direction of incidence of the laser light, and emits return light from the condenser lens at a predetermined angle with regard to the direction of incidence of the return light. The spatial filter comprises a pair of condenser lenses disposed such that the focal point is formed therebetween, and a pinhole mask disposed such that the pinhole is located at the focal point. At least, a part of the return light emitted from the optical isolator is blocked by the pinhole mask of the spatial filter.

5 Claims, 7 Drawing Sheets

U.S. PATENT DOCUMENTS

| | | |
|---|---|---|
| 6,742,694 B2 | 6/2004 | Satoh et al. |
| 6,747,243 B1 | 6/2004 | Reinhardt |
| 6,888,853 B1 * | 5/2005 | Jurgensen .................. 372/6 |
| 7,287,312 B2 | 10/2007 | Yamaguchi |
| 2006/0092994 A1 | 5/2006 | Frankel et al. |
| 2006/0204177 A1 | 9/2006 | Singh et al. |
| 2008/0013163 A1 | 1/2008 | Leonardo et al. |
| 2008/0053970 A1 | 3/2008 | Nakamae |
| 2009/0091839 A1 | 4/2009 | Kakui et al. |
| 2009/0272877 A1 | 11/2009 | Tamaoki et al. |

FOREIGN PATENT DOCUMENTS

| | | |
|---|---|---|
| JP | 61-58809 | 12/1986 |
| JP | 05-224151 | 9/1993 |
| JP | 06-077638 A | 3/1994 |
| JP | 09-054283 A | 2/1997 |

* cited by examiner

LASER PROCESSING APPARATUS

BACKGROUND OF THE INVENTION

1. Field of the Invention

The present invention relates to a laser processing apparatus including a fiber laser light source.

2. Related Background Art

A laser processing apparatus is an apparatus that processes an object to be processed by irradiating the object with laser light. Further, as an example of a laser processing apparatus, an apparatus that comprises a fiber laser light source is known. In a laser processing apparatus comprising a fiber laser light source of this kind, the laser light emitted from the fiber laser light source has a predetermined divergence angle and the laser light is therefore temporarily collimated by a collimator with the beam diameter in an enlarged state. The laser light having been collimated in this manner is condensed on the object by the condenser lens (laser light irradiation).

In addition, an optical isolator is disposed on the light path between the collimator and condenser lens. The optical isolator is provided in order to prevent reflected light (return light) that is produced as a result of the laser light irradiation with respect to the object from returning to the fiber laser light source. As a result, protection of the fiber laser light source is sought. In a laser processing apparatus, because the laser light emitted from the fiber laser light source is nonpolarized light, a nonpolarization-type optical isolator is generally applied. This nonpolarization-type optical isolator emits a vertical incidence component in the laser light (forward propagation light) which arrives from the collimator in a vertical direction toward the condenser lens while emitting the vertical incidence component in the return light arriving from the condenser lens (reverse propagation light) at a predetermined exit angle toward the collimator.

The light path of the return light propagating from the optical isolator to the collimator (hereinafter referred to as 'reverse light path') differs from the light path of the laser light propagating from the collimator toward the optical isolator (hereinafter referred to as 'forward light path'). Based on this fact, when an adequate distance between the collimator and optical isolator is provided, the return light from the optical isolator to the collimator is not introduced to the collimator. Thus, a conventional laser processing apparatus prevents the return light from arriving at the fiber laser light source by providing an adequate installation distance between the collimator and optical isolator (protection of fiber laser light source).

SUMMARY OF THE INVENTION

The inventors have studied conventional laser processing apparatuses in detail, and as a result, have found problems as follows. That is, in a nonpolarization-type optical isolator applied to a conventional laser processing apparatus, the total emission angle of the return light propagating along the reverse light path is actually on the order of two degrees and a high-accuracy design nonpolarization-type optical isolator also has a total emission angle of approximately one degree. Therefore, in order to protect the fiber laser light source by preventing the entry of the reflected light from the nonpolarization-type optical isolator to the collimator, the distance between the collimator and the optical isolator must be increased. As a result, the laser processing apparatus grows in size.

In order to overcome the above-mentioned problems, it is an object of the present invention to provide a laser processing apparatus which can be miniaturized and which has a structure that serves to provide effective protection of the fiber laser light source.

A laser processing apparatus according to the present invention comprises a fiber laser light source, a collimator, a first condenser lens, an optical isolator, and a spatial filter. The fiber laser light source emits laser light. The collimator collimates laser light emitted from the fiber laser light source in a state where the laser light is enlarged to a predetermined beam diameter. The first condenser lens condenses the laser light emitted from the collimator on the object to be processed (laser irradiation). The optical isolator is disposed on the light path between the collimator and the first condenser lens. In addition, the optical isolator emits laser light, as forward propagation light that has reached from the collimator, in parallel to the direction of incidence of the laser light, and emits return light, as reverse propagation light that has reached from the first condenser lens side, at a predetermined angle with regard to the direction of incidence of the return light. The spatial filter is disposed on the light path between the collimator and the optical isolator. The spatial filter has a second condenser lens temporarily condensing the laser light from the collimator, a third condenser lens disposed closer to the optical isolator than the focal point of the laser light having passed through the second condenser lens and collimating the laser light condensed by the second condenser lens, and a pinhole mask disposed such that the pinhole is located at the focal point of the laser light formed between the second and third condenser lenses.

The optical isolator preferably comprises a pair of wedge-shaped birefringence plates and a Faraday rotator provided between the one pair of wedge-shaped birefringence plates.

In the laser processing apparatus according to the present invention, the laser light emitted from the fiber laser light source is collimated by the collimator in a state where the laser light is enlarged to a predetermined beam diameter. The laser light emitted from the collimator is condensed by the first condenser lens after passing through the spatial filter and optical isolator along the forward light path (a light path for laser light that propagates via the collimator, optical isolator, and first condenser lens in that order). When the laser light thus condensed is irradiated onto the object, reflected light (return light) is produced by the object. The return light is collimated by the first condenser lens and then reaches the spatial filter from the optical isolator along the reverse light path (a light path for return light that propagates via the first condenser lens, optical isolator, and collimator in that order) that differs from the forward light path. Hence, at least a part of the return light that is introduced at a predetermined angle to the spatial filter is blocked by the pinhole mask. As a result of this constitution, the return light reaching the fiber laser light source from the optical isolator through the collimator is drastically reduced.

In the case of a parallel planar optical isolator, because the emitted light is parallel light, the diameter of the pinhole (aperture) is preferably also smaller than the light region that is displaced by the optical isolator. The original function of a spatial filter is to remove noise close to the center whereas this is not an object of the present invention. In the field of lasers, noise close to the center is barely a problem. In the case of parallel light, although this light is condensed by a lens and enters the pinhole, when the diameter of the opening in the lens is restricted, the light does not enter the pinhole and therefore a parallel planar optical isolator is also applicable.

Furthermore, in the case of an optical isolator including one pair of wedge-shaped birefringence plates and a Faraday rotator, not only is the emitted light from the optical isolator displaced from the original position (light path) but the angle thereof is also shifted. Hence, the focal point of the condenser lens utilized for the spatial filter is further displaced as a result of angular displacement also being applied, and is easily blocked at the periphery of the pinhole of the pinhole mask. The coupling efficiency of the condenser lens is more greatly influenced by the angular displacement than by the positional displacement of the incident beam. This effect is even greater for a spatial filter that uses two condenser lenses.

In a laser processing apparatus having the above constitution, the optical isolator emits return light, having propagated in a reverse direction in the laser light forward light path from the optical isolator to the first condenser lens, at a predetermined angle with regard to the direction of incidence of the return light. In this case, the reverse light path of the return light emitted from the optical isolator toward the collimator then forms a predetermined angle to the forward light path of the laser light from the collimator toward the optical isolator. The spatial filter is effective in the blocking of return light that has been introduced at a predetermined angle to the forward light path of the laser light from the collimator toward the optical isolator. However, the return light components that are introduced to the optical isolator at a predetermined angle to the forward light path of the laser light emitted from the optical isolator toward the first condenser lens, within the return light returning from the first condenser lens toward the optical isolator, contains a component propagating in the reverse direction along the forward light path of the laser light from the collimator toward the optical isolator. The spatial filter is unable to block such a return light component (vertical incidence component). Therefore, instead of the spatial filter with the above structure, the laser processing apparatus according to the present invention may also comprise a beam expander, disposed between the optical isolator and the first condenser lens, enlarging the beam diameter of the laser light from the optical isolator toward the first condenser lens. The beam expander comprises a fourth condenser lens temporarily condensing the laser light from the optical isolator, a fifth condenser lens, disposed closer to the first condenser lens than the focal point of the laser light having passed through the fourth condenser lens, collimating the laser light condensed by the fourth condenser lens, and a pinhole mask disposed such that the pinhole is located at the focal point which is formed between the fourth and fifth condenser lenses.

That is, the return light propagating in a reverse direction along the forward light path of the laser light from the collimator toward the optical isolator is blocked beforehand by a beam expander disposed between the optical isolator and first condenser lens. Furthermore, the optical isolator itself emits the return light, which propagates in the reverse direction along the forward light path of the laser light from the optical isolator to the first condenser lens, at a predetermined angle with regard to the direction of incidence of the return light. As a result of this constitution, the return light reaching the fiber laser light source from the optical isolator through the collimator is reduced to a large extent.

In addition, the laser processing apparatus according to the present invention may also comprise both a spatial filter disposed between the collimator and the optical isolator and also a beam expander disposed between the optical isolator and the first condenser lens. In this case, the return light propagating in the reverse direction along the forward light path of the laser light from the collimator toward the optical isolator is blocked beforehand by the beam expander disposed between the optical isolator and the first condenser lens. Further, since the return light emitted from the optical isolator toward the collimator also propagates along the reverse light path forming a predetermined angle to the forward light path of the laser light from the collimator toward the optical isolator, the return light is blocked by the spatial filter disposed between the collimator and optical isolator. In this constitution, most components of the return light reaching the fiber laser light source from the optical isolator through the collimator are blocked.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DETAILED DESCRIPTION OF THE PREFERRED EMBODIMENTS

In the following, embodiments of a laser processing apparatus according to the present invention will be explained in detail with reference to FIGS. 1-3, 4A-4B, and 5-7. In the explanation of the drawings, constituents identical to each other will be referred to with numerals identical to each other without repeating their overlapping descriptions.

First Embodiment

Figure 1:
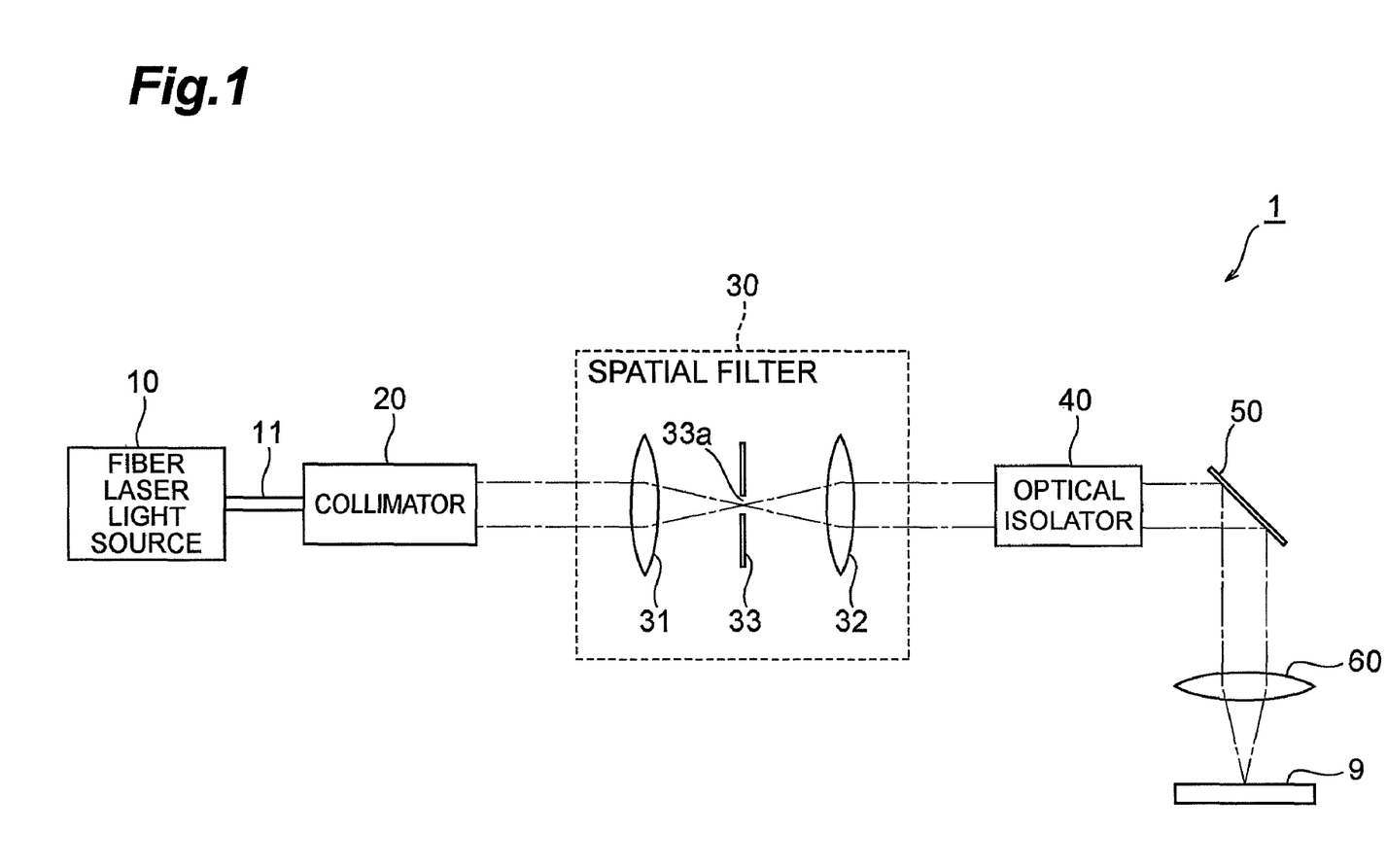
FIG. 1 is a view showing the constitution of a first embodiment of the laser processing apparatus according to the present invention.

FIG. 1 is a view showing the constitution of the first embodiment of the laser processing apparatus according to the present invention. As shown in FIG. 1, the laser processing apparatus 1 according to the first embodiment is an apparatus that processes an object 9 (object to be processed) by irradiating laser light condensed with respect to the object 9, and comprises a fiber laser light source 10, a collimator 20, a spatial filter 30, an optical isolator 40, a mirror 50, and a condenser lens 60 (first condenser lens).

The fiber laser light source 10 includes an amplification optical fiber (a silica-based optical fiber whose core region is doped with the element Yb, for example) as an optical amplification medium and, by supplying pumping light to the amplifying optical fiber, laser light is generated in the amplification optical fiber. The laser light generated in the amplification optical fiber propagates through the optical fiber 11 toward the collimator 20. The optical fiber 11 may be an amplification optical fiber or may be another fiber which is connected to the amplification optical fiber.

The collimator 20 collimates the laser light emitted from the fiber laser light source 10 in a state where the laser light is enlarged to a predetermined beam diameter. The collimated laser light is emitted to the spatial filter 30.

The spatial filter 30 is disposed on the light path between the collimator 20 and optical isolator 40. The spatial filter 30 temporarily condenses the laser light reaching from the collimator 20 side and emits the condensed laser light to the optical isolator 40. The spatial filter 30 includes a condenser lens 31 (second condenser lens), a condenser lens 32 (third condenser lens), and a pinhole mask 33. The pinhole mask 33 has an aperture 33a (pinhole). The distance between the condenser lens 31 and pinhole mask 33 is equal to the focal length of the condenser lens 31. The distance between the condenser lens 32 and pinhole mask 33 is equal to the focal length of the condenser lens 32. The aperture 33a in the pinhole mask 33 is at the respective focal lengths of the condenser lenses 31 and 32.

The optical isolator 40 is a nonpolarization-type isolator that emits laser light having been transmitted by the spatial filter 30 to the mirror 50, and, on the other hand, emitting return light from the mirror 50 to the spatial filter 30 at a different angle from the direction of incidence. That is, the optical isolator 40 emits laser light, as a forward propagation light having reached from the collimator 20 side, in parallel to the direction of incidence of the laser light, and, on the other hand, emitting return light. As a reverse propagation light having reached from the condenser lens 60 side, at a predetermined angle to the direction of incidence of the return light. In other words, the optical isolator 40 emits the return light having propagated in the reverse direction along the forward light path of the laser light from the optical isolator 40 toward the condenser lens 60 at a predetermined angle to the direction of incidence of the return light. In this case, the forward light path of the return light emitted from the optical isolator 40 toward the collimator 20 forms a predetermined angle with respect to the forward light path of the laser light from the collimator 20 toward the optical isolator 40.

The mirror 50 reflects laser light having reached from the optical isolator 40 toward the condenser lens 60. The condenser lens 60 condenses the laser light having reached from the mirror 50 toward the object 9 (laser irradiation). The direction of the reflective surface of the mirror 50 can be changed. That is, the position on the object 9, in which the laser light having propagating via the mirror 50 is irradiated as condensed light, can accordingly be changed.

A specific constitutional example of the laser processing apparatus 1 according to the first embodiment is as follows. The fiber laser light source 10 emits pulse laser light of 10 W/5 kW. The collimator 20 collimates laser light with a beam diameter of 1.6 mm ($1/e^2$). The interval between the optical isolator 40 and collimator 20 is approximately 250 mm. The respective condenser lenses 31 and 32 are convex lenses with a focal length of 100 mm and are disposed spaced apart from one another by 200 mm. The pinhole mask 33 which is disposed in the center between the condenser lens 31 and condenser lens 32 has an aperture 33a with a diameter of 100 μm formed therein.

Figure 2:
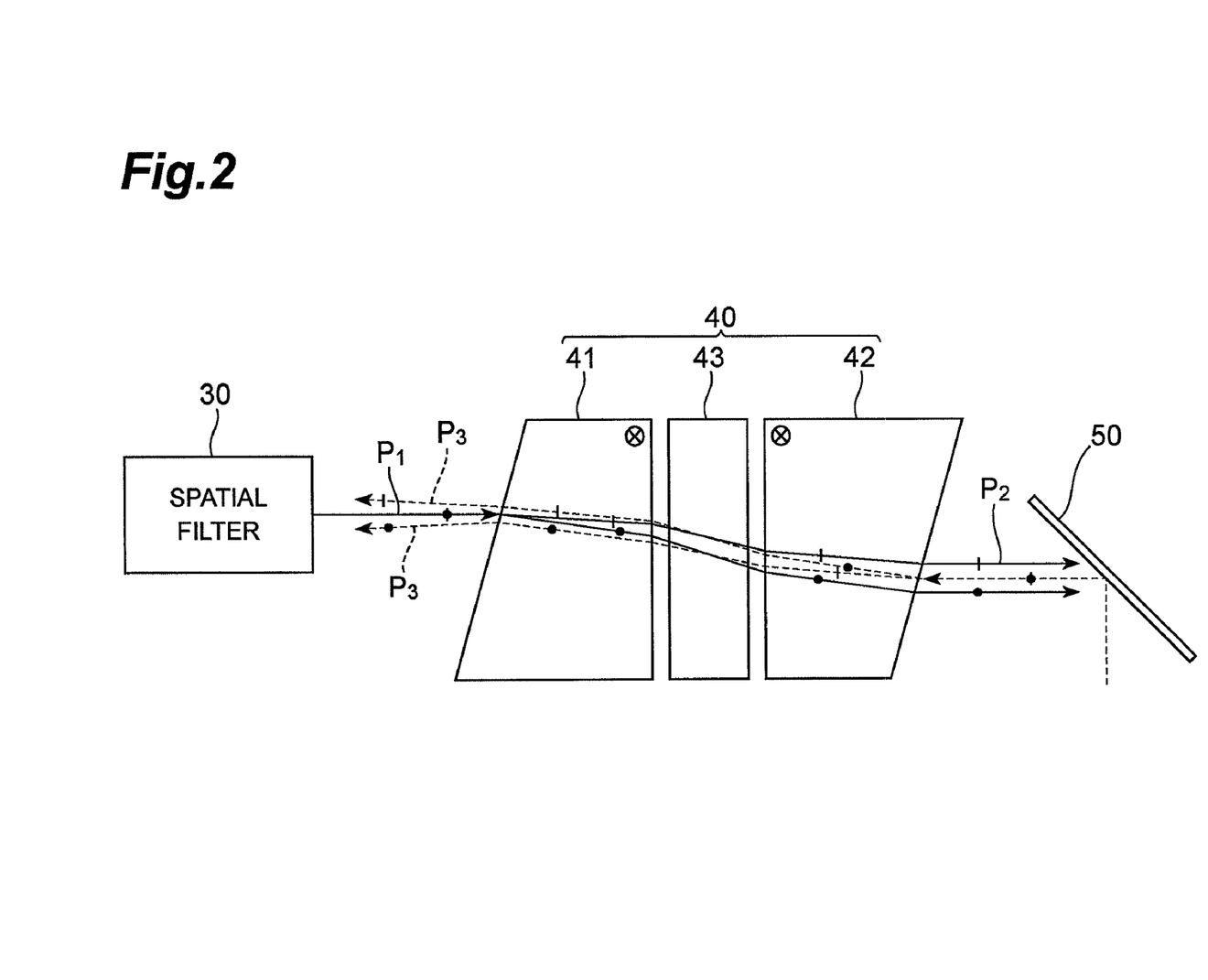
FIG. 2 is a view for explaining the structure and functions of the optical isolator.

FIG. 2 is a view for explaining the structure and functions of the optical isolator 40. The optical isolator 40 includes a pair of wedge-shaped birefringence plates 41, 42 and a Faraday rotator 43 provided between the pair of wedge-shaped birefringence plates 41, 42.

The light introduced to the optical isolator 40 along forward light path $P_1$ from the spatial filter 30 (propagation light path of the laser light from the collimator 20 toward the optical isolator 40) is emitted from the optical isolator 40 to the mirror 50 via the birefringence plate 41, Faraday rotator 43, and birefringence plate 42 in that order. The emitted light is propagated along a light path $P_2$ (a propagation light path for laser light from the optical isolator 40 toward the condenser lens 60) and, after being reflected by the mirror 50, is condensed by the condenser lens 60.

Conversely, the return light propagating in the reverse direction along light path $P_2$ from mirror 50 and reaching the optical isolator 40 passes via the birefringence plate 42, Faraday rotator 43, and birefringence plate 41 in that order, and thereafter being emitted to the spatial filter 30 from the optical isolator 40. The emitted light propagating along a reverse light path $P_3$ (a light path which forms a predetermined angle to the forward light path $P_1$ for the laser light from the optical isolator 40 toward the collimator 20), and thereafter being introduced to the spatial filter 30.

Thus, in the nonpolarization-type optical isolator 40, the reverse light path $P_3$ of the return light from the optical isolator 40 to the spatial filter 30 forms a predetermined angle with the forward light path $P_1$ for laser light from the spatial filter 30 toward the optical isolator 40. In a commercial nonpolarization-type optical isolator, the divergence angle of the reverse light path $P_3$ is generally on the order of two degrees and, for a high-accuracy design optical isolator, on the order of one degree.

Figure 3:
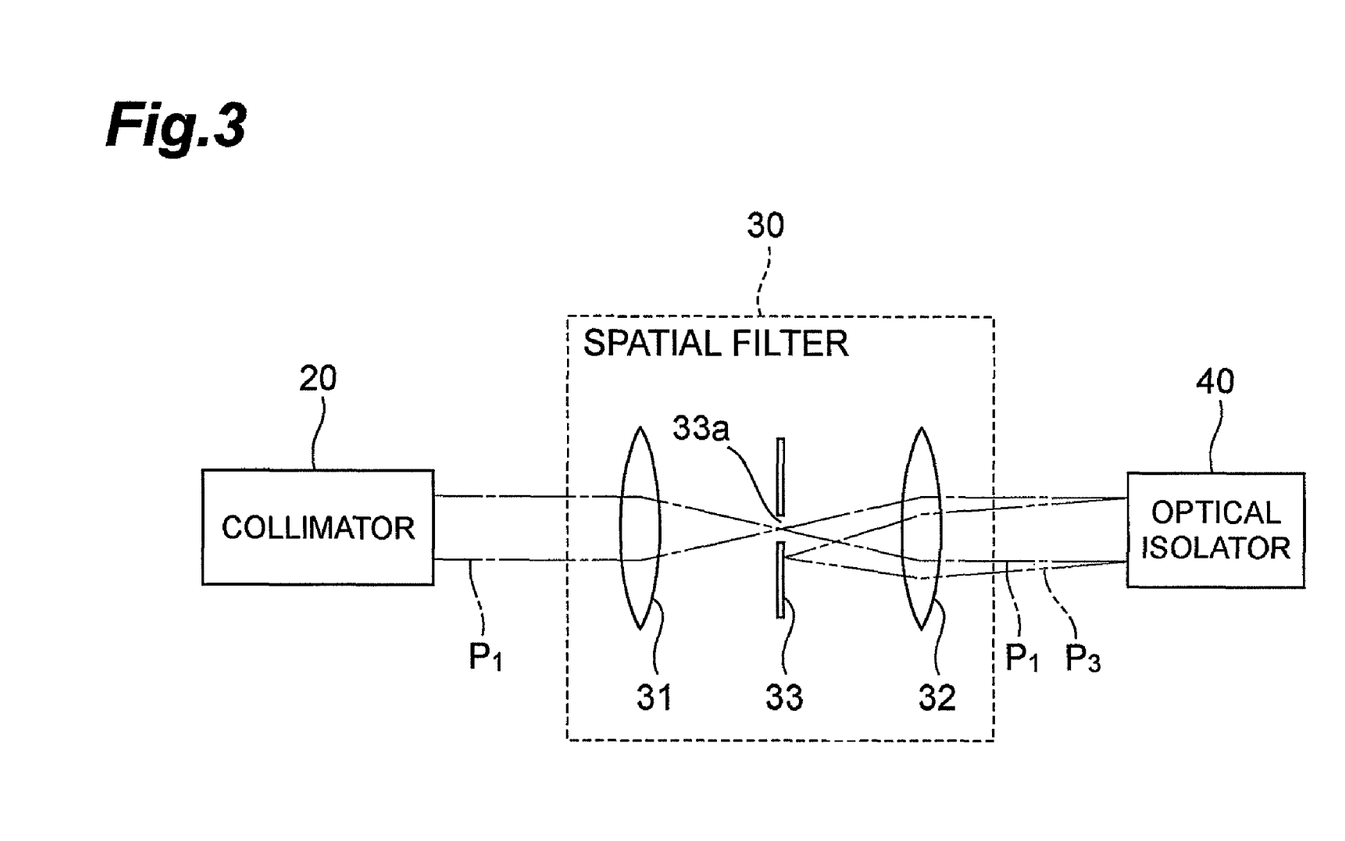
FIG. 3 is a view for explaining the function of a spatial filter.

FIG. 3 is a view for explaining the functions of the spatial filter 30. The laser light propagating along the forward light path $P_1$ from the collimator 20 toward the spatial filter 30, which is indicated by the dot-chain line in FIG. 3, is condensed in the position of the aperture 33a in the pinhole mask 33 by the condenser lens 31. Thereafter, the laser light is collimated by the condenser lens 32 and propagates toward the optical isolator 40 along the forward light path $P_1$.

However, the return light having propagated along the reverse light path $P_3$ from the optical isolator 40 toward the collimator 20, which is indicated by the two-dot chain line, is condensed in a position other than that of the aperture 33a in the pinhole mask 33 by the condenser lens 32 because the reverse light path $P_3$ differs from the forward light path $P_1$. That is, the return light having propagated along the reverse light path $P_3$ is blocked by the pinhole mask 33.

In the laser processing apparatus 1 according to the first embodiment which is constituted as detailed hereinabove, the laser light emitted from the fiber laser light source 10 is collimated by the collimator 20 in a state where the collimated laser light is enlarged to a predetermined beam diameter. The laser light emitted from the collimator 20 propagates along the forward light path $P_1$ and reaches at the spatial filter 30. The laser light having reached the spatial filter 30 is condensed temporarily by the condenser lens 31, transmitted by the aperture 33a in the pinhole mask 33, and then collimated once again in a state where the laser light is enlarged to a predetermined beam diameter by the condenser lens 32. In addition, the laser light transmitted by the spatial filter 30 passes through the optical isolator 40 and is reflected by the mirror 50. The reflected laser light is condensed by the condenser lens 60. When the condensed laser light is irradiated onto the object 9, reflected light (return light) is generated by the object 9.

The reflected light (return light) from the object 9 is collimated by the condenser lens 60 and reaches at the optical isolator 40 after passing through the mirror 50. The reflected light, introduced to the optical isolator 40 in the reverse direction along light path $P_2$, is introduced by the optical isolator 40 to the spatial filter 30 along the reverse light path $P_3$ which differs from the forward light path $P_1$. The reflected light introduced to the spatial filter 30 is condensed in a position which is spaced apart from the aperture 33a in the pinhole mask 33 by the condenser lens 32. As a result, a part of the reflected light is blocked by the pinhole mask 33.

As described above, the laser processing apparatus 1 according to the first embodiment is able to block a part of the reflected light produced by the object 9 by means of the spatial filter 30 provided between the collimator 20 and the optical isolator 40 even when the interval between the collimator 20 and optical isolator 40 is small by means of the spatial filter 30. Therefore, the protection of the fiber laser light source 10 can be achieved. In addition, because the interval between the collimator 20 and the optical isolator 40 can be reduced, the laser processing apparatus 1 can be miniaturized.

Second Embodiment

Figure 4:
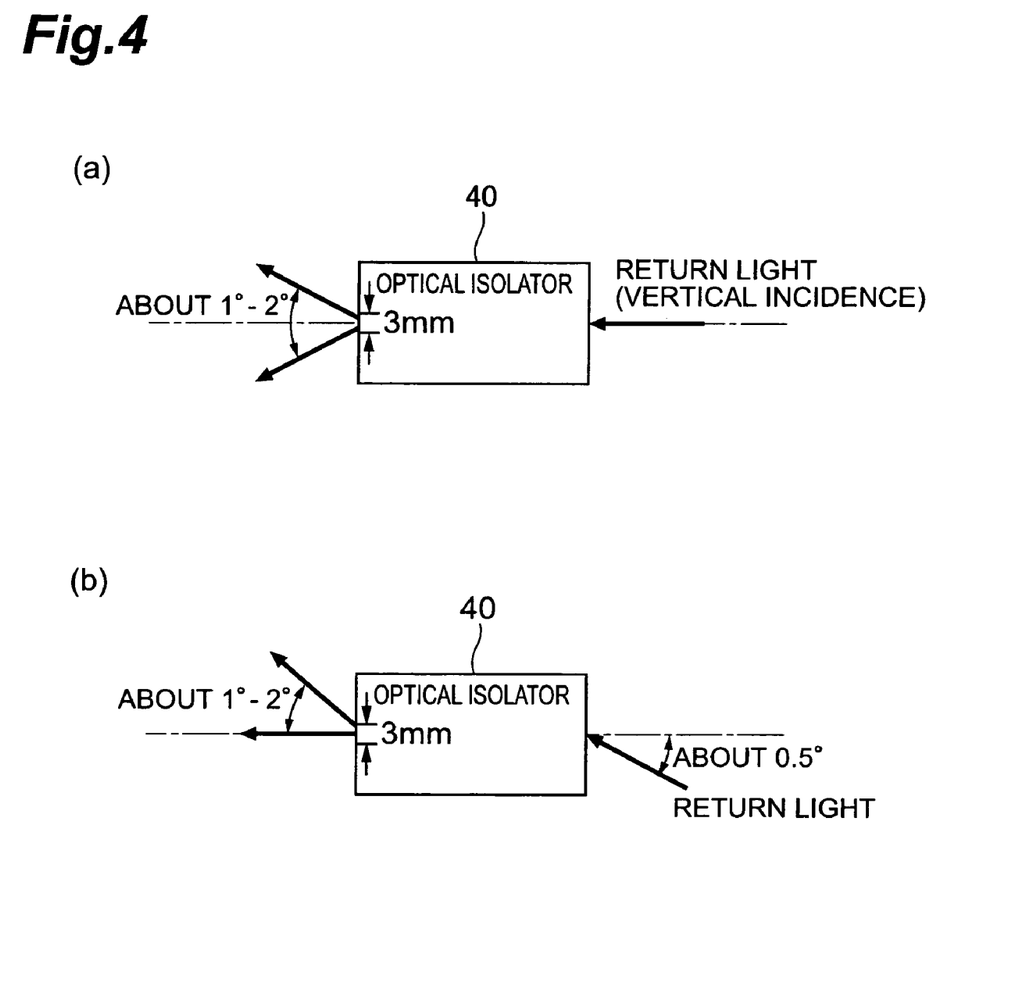
FIGS. 4A and 4B are views for explaining the problems with the laser processing apparatus according to the first embodiment.

In the laser processing apparatus 1 according to the first embodiment, the optical isolator 40 emits reflected light (return light), having propagated in the reverse direction along the light path $P_2$ for laser light from the optical isolator 40 to the condenser lens 60, at a predetermined angle to the direction of incidence of the reflected light. The spatial filter 30 is thus effective in the blocking of reflected light propagating along the reverse light path $P_3$ which differs from the forward light path $P_1$. This is because, as shown in FIG. 4A, the total emission angle of the optical isolator 40 which has an opening with a diameter on the order of 3 mm is approximately on the order of one to two degrees to the light that is introduced vertically. However, as shown in FIG. 4B, there are components propagating in the reverse direction along the forward light path $P_1$, within the reflected light components introduced to the optical isolator 40 at an angle of approximately 0.5 degrees, for example, to the light path $P_2$ of the reflected light from the condenser lens 60 toward the optical isolator 40. The spatial filter 30 is unable to block these reflected light components (vertical incidence components). Therefore, instead of the spatial filter 30 of the first embodiment, the second embodiment of the laser processing apparatus according to the present invention comprises a beam expander 70, which is disposed between the optical isolator 40 and condenser lens 60, enlarging the beam diameter of the laser light from the optical isolator 40 to the condenser lens 60.

Figure 5:
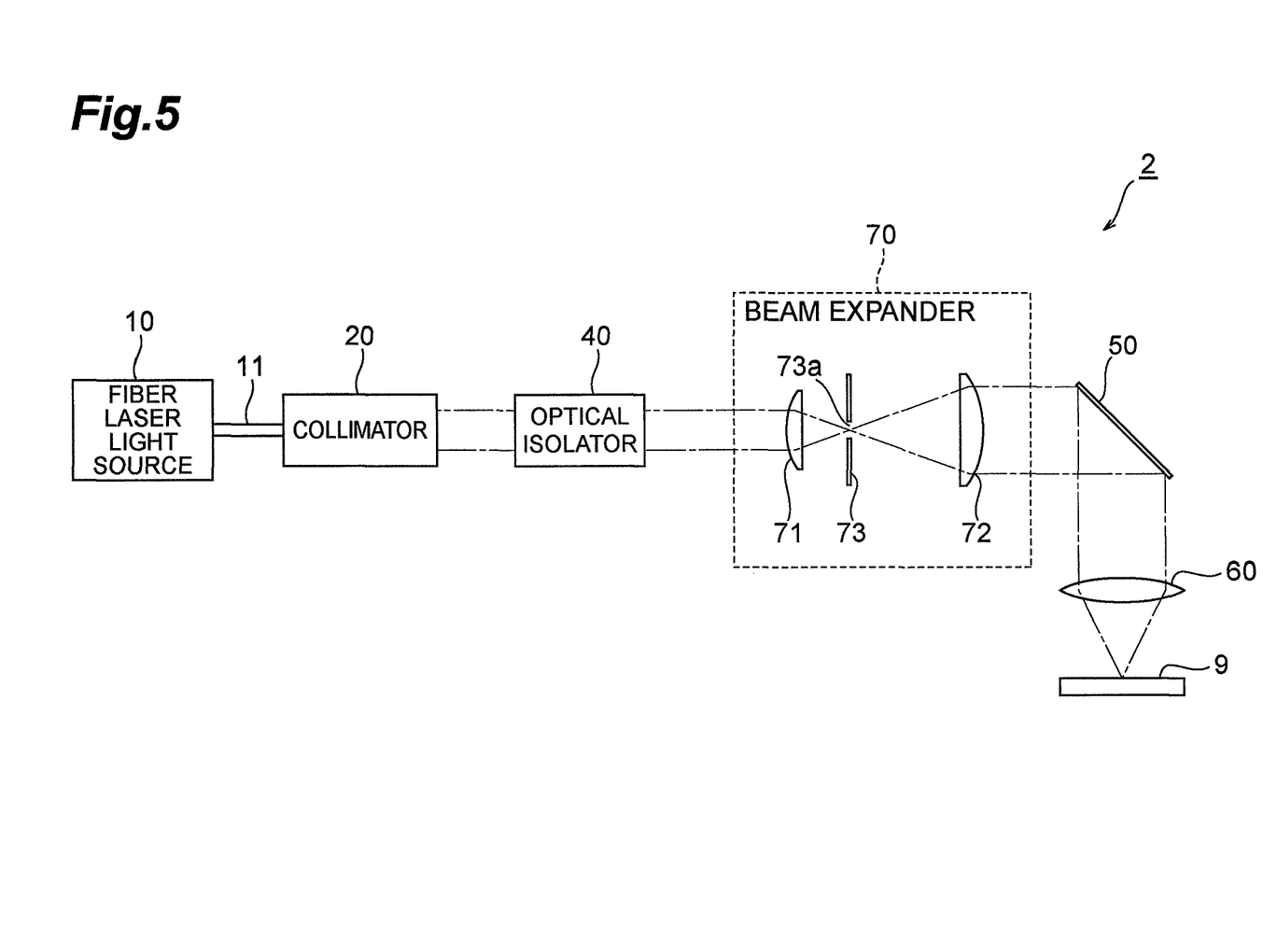
FIG. 5 is a view showing the constitution of a second embodiment of the laser processing apparatus according to the present invention.

FIG. 5 is a view showing the constitution of the second embodiment of the laser processing apparatus according to the present invention. As shown in FIG. 5, the laser processing apparatus 2 according to the second embodiment is an apparatus that processes the object 9 by irradiating condensed laser light onto the object 9, and comprises a fiber laser light source 10, a collimator 20, an optical isolator 40, a beam expander 70, a mirror 50, and a condenser lens 60 (first condenser lens).

The fiber laser light source 10 includes an amplification optical fiber (a silica-based optical fiber whose core region is doped with the element Yb, for example) as an optical amplification medium and, by supplying pumping light to the amplification optical fiber, laser light is generated in the amplification optical fiber. The laser light generated in the amplification optical fiber propagates through the optical fiber 11 toward the collimator 20. The optical fiber 11 may be an amplification optical fiber or may be another fiber which is connected to the amplification optical fiber.

The collimator 20 collimates the laser light emitted from the fiber laser light source 10 in a state where the laser light is enlarged to a predetermined beam diameter. The collimated laser light is emitted to the optical isolator 40.

The optical isolator 40 is a nonpolarization-type isolator with the structure in FIG. 2 which emits laser light having been emitted from the collimator 20 to the beam expander 70 and which emits return light from the beam expander 70 to the collimator 20 at a different angle from the direction of incidence of the return light which has reached the optical isolator 40. That is, the optical isolator 40 emits laser light, as forward propagation light having reached from the collimator 20 side, in parallel to the direction of incidence of the laser light, and, on the other hand, emits return light, as reverse propagation light having reached from the condenser lens 60 side, at a predetermined angle to the direction of incidence of the return light which has reached the optical isolator 40. In other words, the optical isolator 40 emits the return light, which has propagated in the reverse direction along the forward light path of the laser light from the optical isolator 40 to the condenser lens 60, at a predetermined angle to the direction of incidence of the return light which has reached the optical isolator 40. In this case, the light path of the return light emitted from the optical isolator 40 to the collimator 20 forms a predetermined angle with respect to the forward light path of the laser light from the collimator 20 toward the optical isolator 40.

The beam expander 70 is disposed on the light path between the optical isolator 40 and condenser lens 60. The beam expander 70 temporarily condenses the laser light having reached from the optical isolator 40 side and then emits the laser light to the condenser lens 60. The beam expander 70 includes a condenser lens 71 (fourth condenser lens), a condenser lens 72 (fifth condenser lens), and a pinhole mask 73. The pinhole mask 73 has an aperture 73a (pinhole). The distance between the condenser lens 71 and pinhole mask 73 is equal to the focal length of the condenser lens 71. The distance between the condenser lens 72 and pinhole mask 73 is equal to the focal length of the condenser lens 72. The aperture 73a of the pinhole mask 73 is disposed at the focal points of each of the condenser lenses 71 and 72.

The mirror 50 reflects laser light having reached from the beam expander 70 toward the condenser lens 60. The condenser lens 60 condenses the laser light having reached from the mirror 50 toward the object 9 (laser irradiation). The direction of the reflective surface of the mirror 50 can be changed. That is, the position on the object 9 in which the laser light having propagated via the mirror 50 can accordingly be changed.

A specific constitutional example of the laser processing apparatus 2 according to the second embodiment is as follows. The fiber laser light source 10 emits pulse laser light of 10 W/5 kW. The collimator 20 collimates laser light of a beam diameter 1.6 mm ($1/e^2$). The interval between the optical isolator 40 and collimator 20 is approximately 250 mm. The condenser lens 71 is a convex lens with a focal length of 100 mm and the condenser lens 72 is a convex lens with a focal length of 200 mm. The condenser lenses 71, 72 are disposed spaced apart from one another by 300 mm. The pinhole mask 73 disposed at the focal point formed between the condenser lens 71 and condenser lens 72 has an aperture 73a with a diameter of 100 μm formed therein.

The optical isolator 40 has the structure shown in FIG. 2 and, as shown in FIGS. 4A and 4B, operates in the same way as that of first embodiment.

Figure 6:
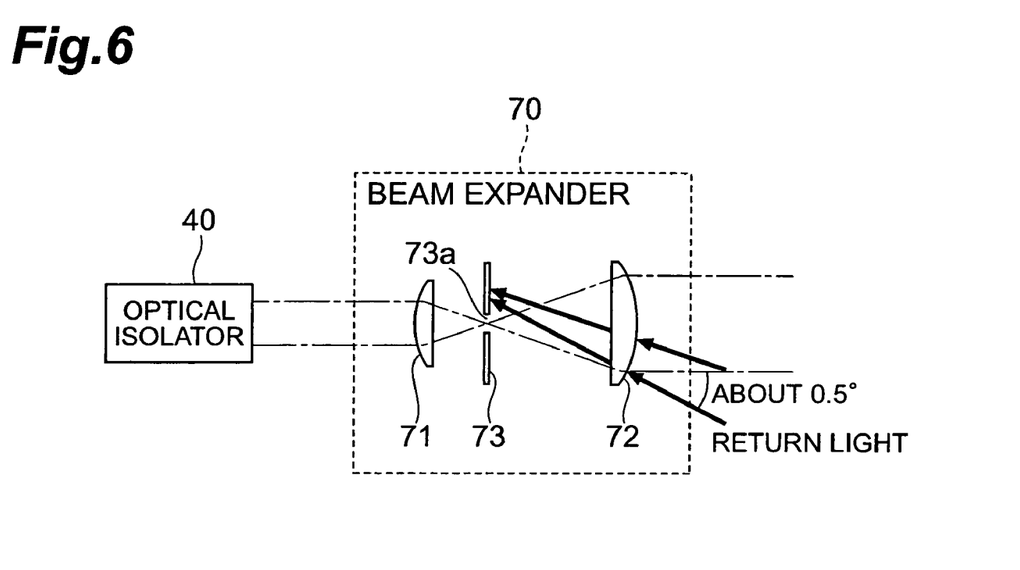
FIG. 6 is a view for explaining the functions of a beam expander.

FIG. 6 is a view for explaining the functions of the beam expander 70. The laser light propagating from the optical isolator 40 toward the beam expander 70, which is indicated by the dot-chain line in FIG. 6, is condensed in the position of the aperture 73a of the pinhole mask 73 by the condenser lens 71. Thereafter, the laser light is collimated by the condenser lens 72 in a state where it is expanded to a beam diameter enlarged more than the diameter of the incident beam entering to the beam expander 70, and propagates toward the condenser lens 60.

On the other hand, the return light introduced at an angle on the order of 0.5 degrees, for example, to the forward light path of the laser light, in the return light propagating in the reverse direction from the condenser lens 60 toward the optical isolator 40, which is indicated by the bold line, is condensed by the condenser lens 72 in a position other than the aperture 73a of the pinhole mask 73. As a result, the return light that has been propagated in the reverse direction along the light path, which forms a predetermined angle to the forward light path of the laser light emitted from the beam expander 70, is blocked by the pinhole mask 73.

In the laser processing apparatus 2 according to the second embodiment which is constituted as detailed hereinabove, the laser light emitted from the fiber laser light source 10 is collimated in a state where it is enlarged to a predetermined beam diameter by the collimator 20. The laser light emitted from the collimator 20 reaches the beam expander 70 after passing through the optical isolator 40. The laser light reaching the beam expander 70 is condensed temporarily by the condenser lens 71, passes through the aperture 73a of the pinhole mask 73, and then collimated once again in a state where the laser light is enlarged to a predetermined beam diameter by the condenser lens 72. In addition, the laser light having passed through the beam expander 70 is reflected by the mirror 50. The reflected laser light is condensed by the condenser lens 60. When the condensed laser light is irradiated onto the object 9, reflected light (return light) is generated by the object 9.

The reflected light (return light) from the object 9 is collimated by the condenser lens 60 and reaches the beam expander 70 after propagating via the mirror 50. As a result of the beam expander 70, only the component in the reflected light having reached from the mirror 50, which propagates in the reverse direction along the forward light path of the laser light emitted from the optical isolator 40, reaches the optical isolator 40. That is, a part of the reflected light introduced at a predetermined angle is condensed by the condenser lens 72 in a position that is away from the aperture 73a of the pinhole mask 73. As a result, a part of the reflected light is blocked by the pinhole mask 73 (See FIG. 6). Further, the reflected light introduced to the optical isolator 40 propagates along light path that forms a predetermined angle to the forward light path of the laser light from the collimator 20 toward the optical isolator 40, as is shown in FIG. 4A. In this case, when a certain magnitude of interval is secured between the collimator 20 and optical isolator 40, the possibility that reflected light from the optical isolator 40 will be introduced to the collimator 20 is sufficiently diminished.

As described above, so too with the laser processing apparatus 2 according to the second embodiment, the reflected light reaching the fiber laser light source 10 via the collimator 20 from the optical isolator 40 is drastically reduced.

Third Embodiment

In addition, the third embodiment of the laser processing apparatus according to the present invention possesses the characteristics of both of the first and second embodiments. That is, FIG. 7 shows the constitution of the third embodiment of the laser processing apparatus according to the present invention.

Figure 7:
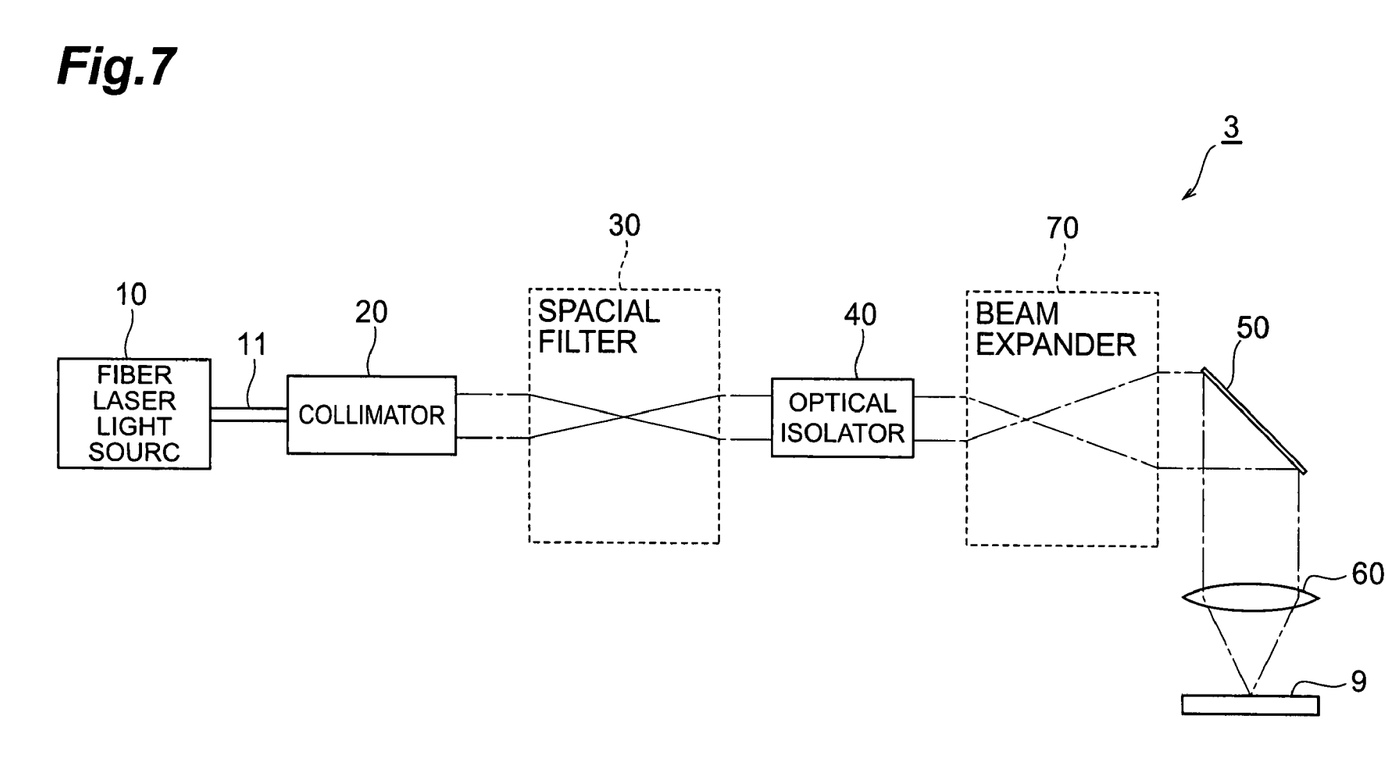
FIG. 7 is a view showing the constitution of a third embodiment of the laser processing apparatus according to the present invention.

As shown in FIG. 7, a laser processing apparatus 3 according to the third embodiment is an apparatus that processes the object 9 by irradiating the object 9 with condensed laser light, and comprises a fiber laser light source 10, a collimator 20, a spatial filter 30, an optical isolator 40, a beam expander 70, a mirror 50, and a condenser lens 60 (first condenser lens).

The fiber laser light source 10 includes an amplification optical fiber (a silica-based optical fiber whose core region is doped with the element Yb, for example) as an optical amplification medium and, by supplying pumping light to the amplification optical fiber, laser light is generated in the amplification optical fiber. The laser light generated in the amplification optical fiber propagates through the optical fiber 11 toward the collimator 20. The optical fiber 11 may be an amplification optical fiber or may be another optical fiber which is connected to the amplification optical fiber.

The collimator 20 collimates the laser light emitted from the fiber laser light source 10 in a state where the laser light is enlarged to a predetermined beam diameter. The collimated laser light is emitted to the optical isolator 40.

The spatial filter 30 is disposed on the light path between the collimator 20 and optical isolator 40, as shown in FIG. 3. The spatial filter 30 temporarily condenses the laser light arriving from the collimator 20 side and emits the laser light to the optical isolator 40. The spatial filter 30 includes a condenser lens 31 (second condenser lens), a condenser lens 32 (third condenser lens), and a pinhole mask 33. The pinhole mask 33 has an aperture 33a (pinhole). The distance between the condenser lens 31 and pinhole mask 33 is equal to the focal length of the condenser lens 31. The distance between the condenser lens 32 and pinhole mask 33 is equal to the focal length of the condenser lens 32. The aperture 33a in the pinhole mask 33 is at the respective focal lengths of the condenser lenses 31 and 32.

The optical isolator 40 is a nonpolarization-type isolator with the structure in FIG. 2 which emits laser light having emitted from the spatial filter 30 to the beam expander 70, and which emits return light from the beam expander 70 to the spatial filter 30 at a different angle from the direction of incidence. That is, the optical isolator 40 emits laser light, as forward propagation light having reached from the collimator 20 side, in parallel to the direction of incidence of the laser light, and emits return light, as reverse propagation light having reached from the condenser lens 60 side, at a predetermined angle to the direction of incidence of the return light. In other words, the optical isolator 40 emits the return light, having propagated in the reverse direction along the forward light path of the laser light from the optical isolator 40 to the condenser lens 60, at a predetermined angle to the direction of incidence of the return light. In this case, the forward light path of the return light emitted from the optical isolator 40 to the collimator 20 forms a predetermined angle with respect to the forward light path of the laser light from the collimator 20 toward the optical isolator 40.

The beam expander 70 is disposed on the light path between the optical isolator 40 and condenser lens 60. The beam expander 70 temporarily condenses the laser light that has arrived from the optical isolator 40 side, and then emits the laser light to the condenser lens 60. The beam expander 70 includes the condenser lens 71 (fourth condenser lens), the condenser lens 72 (fifth condenser lens), and the pinhole mask 73. The pinhole mask 73 has an aperture 73a (pinhole). The distance between the condenser lens 71 and pinhole mask 73 is equal to the focal length of the condenser lens 71. The distance between the condenser lens 72 and pinhole mask 73 is equal to the focal length of the condenser lens 72. The aperture 73a of the pinhole mask 73 is disposed at the focal points of each of the condenser lenses 71 and 72.

The mirror 50 reflects laser light having reached from the beam expander 70 toward the condenser lens 60. The condenser lens 60 condenses the laser light having reached from the mirror 50 toward the object 9 (laser irradiation). The direction of the reflective surface of the mirror 50 can be changed. That is, the position on the object 9 in which the laser light having propagated via the mirror 50 can accordingly be changed.

A specific constitutional example of the laser processing apparatus 3 according to the third embodiment is as follows. The fiber laser light source 10 emits pulse laser light of 10 W/5 kW. The collimator 20 collimates laser light of a beam diameter 1.6 mm ($1/e^2$). The interval between the optical isolator 40 and collimator 20 is approximately 250 mm. Furthermore, in the spatial filter 30, the condenser lens 71 is a convex lens with a focal length of 100 mm and the condenser lens 72 is a convex lens with a focal length of 200 mm. The condenser lenses 71, 72 are disposed spaced apart from one another by 300 mm. The pinhole mask 73 disposed at the focal point formed between the condenser lens 71 and condenser lens 72 has an aperture 73a with a diameter of 100 μm formed therein. Further, in the beam expander 70, the condenser lens 71 is a convex lens with a focal length of 100 mm and the condenser lens 72 is a convex lens with a focal length of 200 mm. The condenser lenses 71, 72 are disposed spaced apart from one another by 300 mm. The pinhole mask 73 disposed at the focal point formed between the condenser lens 71 and condenser lens 72 has an aperture 73a with a diameter of 100 μm formed therein.

The optical isolator 40 has the structure shown in FIG. 2 and, as shown in FIGS. 4A and 4B, operates in the same way as that of first and second embodiments.

The spatial filter 30 functions as shown in FIG. 3. That is, the laser light propagated along the forward light path $P_1$ from the collimator 20 to the spatial filter 30, which is indicated by the dot-chain line in FIG. 3, is condensed by the condenser lens 31 in the position of the aperture 33a in the pinhole mask 33. Thereafter, the laser light is collimated by the condenser lens 32 and propagates along the forward light path $P_1$ toward the optical isolator 40.

However, the return light having propagated along the reverse light path $P_3$ from the optical isolator 40 toward the collimator 20, which is indicated by the two-dot chain line, is condensed in a position other than that of the aperture 33a in the pinhole mask 33 by the condenser lens 32 because the reverse light path $P_3$ differs from the forward light path $P_1$. That is, the return light having propagated along the reverse light path $P_3$ is blocked by the pinhole mask 33.

In addition, the beam expander 70 functions as shown in FIG. 6. Namely, the laser light propagating from the optical isolator 40 toward the beam expander 70, which is indicated by the dot chain line in FIG. 6, is condensed by the condenser lens 71 in the position of the aperture 73a of the pinhole mask 73. Thereafter, the laser light is collimated by the condenser lens 72 in a state where the laser light is expanded to a beam diameter that is enlarged more than the diameter of the incident beam entering to the beam expander 70, and propagates toward the condenser lens 60.

On the other hand, the return light introduced at an angle on the order of 0.5 degrees, for example, to the forward light path of the laser light, in the return light propagating in the reverse direction from the condenser lens 60 toward the optical isolator 40, which is indicated by the bold line, is condensed by the condenser lens 72 in a position other than the aperture 73a of the pinhole mask 73. As a result, the return light having propagated in the reverse direction along the light path, which forms a predetermined angle to the forward light path of the laser light emitted from the beam expander 70, is blocked by the pinhole mask 73.

In the laser processing apparatus 3 according to the third embodiment which is constituted as detailed hereinabove, the laser light emitted from the fiber laser light source 10 is collimated in a state where the laser light is enlarged to a predetermined beam diameter by the collimator 20. The laser light emitted from the collimator 20 reaches the spatial filter 30. In the spatial filter 30, the laser light is condensed temporarily by the condenser lens 31, passes through the aperture 33a in the pinhole mask 33, and collimated once again in a state where the laser light is enlarged to a predetermined beam diameter by the condenser lens 32. The laser light passing through the spatial filter 30 reaches the beam expander 70 after passing through the optical isolator 40. The laser light having reached the beam expander 70 is condensed temporarily by the condenser lens 71, passes through the aperture 73a of the pinhole mask 73, and collimated once again in a state where the laser light is enlarged to a predetermined beam diameter by the condenser lens 72. In addition, the laser light passing through the beam expander 70 is reflected by the mirror 50. The reflected laser light is condensed by the condenser lens 60. When the condensed laser light is irradiated onto the object 9, reflected light (return light) is produced by the object 9.

The reflected light (return light) from the object 9 is collimated by the condenser lens 60 and reaches the beam expander 70 via the mirror 50. As a result of the beam expander 70, only the component in the reflected light having reached from the mirror 50, which propagates in the reverse direction along the forward light path of the laser light emitted from the optical isolator 40, reaches the optical isolator 40. That is, a part of the reflected light introduced at a predetermined angle is condensed by the condenser lens 72 in a position that is away from the aperture 73a of the pinhole mask 73. As a result, a part of the reflected light is blocked by the pinhole mask 73 (See FIG. 6). Further, the reflected light introduced to the optical isolator 40 propagates along light path that forms a predetermined angle to the forward light path of the laser light from the collimator 20 toward the optical isolator 40, as is shown in FIG. 4A. Thus, the reflected light introduced to the spatial filter 30 at a predetermined angle of incidence is condensed by the condenser lens 32 in a position that is spaced apart from the aperture 33a in the pinhole mask 33. As a result, a part of the reflected light is blocked by the pinhole mask 33.

Accordingly, the laser processing apparatus 3 according to the third embodiment is able to block the majority of the reflected light from the object 9 which ultimately arrives at the collimator 20 by means of the functions of both the beam expander 70 provided between the optical isolator 40 and condenser lens 60, and the spatial filter 30 provided between the collimator 20 and the optical isolator 40.

As described above, the laser processing apparatus according to the present invention also makes it possible to miniaturize the apparatus size and enable protection of the fiber laser light source through the provision of a structure that effectively blocks the return light from the processing object.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A laser processing apparatus, comprising:
   a fiber laser light source emitting laser light;
   a collimator collimating the laser light emitted from said fiber laser light source in a state where the laser light is enlarged to a predetermined beam diameter;
   a first condenser lens condensing the laser light emitted from said collimator on a predetermined part of an object to be processed;
   an optical isolator arranged on a light path between said collimator and said first condenser lens, said optical isolator emitting laser light, as forward propagation light that has reached from the collimator side, in parallel to a direction of incidence of the laser light, and emitting return light, as reverse propagation light that has reached from the first condenser lens side, at a predetermined angle with regard to a direction of incidence of the return light; and
   a spatial filter arranged on a light path between said collimator and said optical isolator, said spatial filter having:
      a second condenser lens temporarily condensing the laser light from said collimator;
      a third condenser lens, arranged closer to said optical isolator than a focal point of the laser light having passed through said second condenser lens, collimating the laser light condensed by said second condenser lens; and
      a pinhole mask arranged such that a pinhole is located at a focal point of the laser light formed between said second and third condenser lenses.

2. A laser processing apparatus according to claim 1, further comprising a beam expander arranged on a light path between said optical isolator and said first condenser lens, said beam expander enlarging the beam diameter of the laser light directed from said optical isolator toward said first condenser lens, and having:
   a fourth condenser lens temporarily condensing the laser light from said optical isolator;
   a fifth condenser lens, arranged closer to said first condenser lens than a focal point of the laser light having passed through said fourth condenser lens, collimating the laser light condensed by said fourth condenser lens; and
   a pinhole mask arranged such that a pinhole is located at a focal point of the laser light formed between said fourth and fifth condenser lenses.

3. A laser processing apparatus according to claim 1, wherein said optical isolator includes one pair of wedge-shaped birefringence plates, and a Faraday rotator provided between said one pair of wedge-shaped birefringence plates.

4. A laser processing apparatus, comprising:
   a fiber laser light source emitting laser light;
   a collimator collimating the laser light emitted from said fiber laser light source in a state where the laser light is enlarged to a predetermined beam diameter;
   a first condenser lens condensing the laser light emitted from said collimator on a predetermined part of an object to be processed;
   an optical isolator arranged on a light path between said collimator and said first condenser lens, said optical isolator emitting laser light, as forward propagation light that has reached from the collimator side, in parallel to a direction of incidence of the laser light, and emitting return light, as reverse propagation light that has reached from the first condenser lens side, at a predetermined angle with regard to a direction of incidence of the return light; and
   a beam expander arranged on a light path between said optical isolator and said first condenser lens and enlarging a beam diameter of the laser light directed from said optical isolator toward said first condenser lens, said beam expander having:
      a fourth condenser lens temporarily condensing the laser light from said optical isolator;
      a fifth condenser lens, arranged closer to said first condenser lens than a focal point of the laser light having passed through said fourth condenser lens, collimating the laser light condensed by said fourth condenser lens; and
      a pinhole mask arranged such that a pinhole is located at a focal point of the laser light formed between said fourth and fifth condenser lenses.

5. A laser processing apparatus according to claim 4, wherein said optical isolator includes one pair of wedge-shaped birefringence plates, and a Faraday rotator provided between said one pair of wedge-shaped birefringence plates.

* * * * *